(12) United States Patent
Lyhne et al.

(10) Patent No.: US 6,264,567 B1
(45) Date of Patent: *Jul. 24, 2001

(54) ROTATION CONNECTION FOR CONNECTING UNALIGNED MACHINE ELEMENTS

(75) Inventors: Finn Lyhne, Sydals; Tom Tychsen, Gråsten; Hans Christian Petersen, Nordborg; Claus Johansen, Sønderborg, all of (DK)

(73) Assignee: Danfoss A/S, Nordbory (DK)

( * ) Notice: Subject to any disclaimer, the term of this patent is extended or adjusted under 35 U.S.C. 154(b) by 0 days.

This patent is subject to a terminal disclaimer.

(21) Appl. No.: 09/434,955

(22) Filed: Nov. 5, 1999

(30) Foreign Application Priority Data

Nov. 13, 1998 (DE) .............................. 198 52 279

(51) Int. Cl.⁷ .................................................. F16D 3/44
(52) U.S. Cl. ............................................. 464/159; 74/410
(58) Field of Search ..................... 464/106, 159, 464/109, 147, 149, 154, 155, 156, 157, 158; 403/359.1, 359.6; 74/410, 462; 29/893.35

(56) References Cited

U.S. PATENT DOCUMENTS

| 2,035,171 | * | 3/1936 | Loewus | 464/154 |
| 2,318,179 | * | 5/1943 | Mentley | 29/893.35 |
| 2,682,760 | * | 7/1954 | Shenk | 464/154 |
| 3,973,880 | * | 8/1976 | Swedberg | |
| 6,203,439 | | 3/2001 | Tychenet et al. | 464/156 |

FOREIGN PATENT DOCUMENTS

| 1076664 | * | 2/1984 | (SU) | 74/762 |

* cited by examiner

Primary Examiner—Lynne H. Browne
Assistant Examiner—Greg Binda
(74) Attorney, Agent, or Firm—Lee, Mann, Smith, McWilliams, Sweeney & Ohlson

(57) ABSTRACT

The invention concerns a machine arrangement with a first machine having a first rotation connection, a second machine having a second rotation connection, and a shaft for transmission of a torque, the shaft being unrotatably connected with both rotation connections.

In this connection it is desired to minimize the effects of alignment errors on mounting the two motors.

For this purpose the shaft (5) has, at least in one end, an external toothing (6) engaging with an internal toothing (8, 9) of the machine at this end, said external toothing permitting a swivel movement of the shaft (5), the teeth (10) of said external toothing (6) having concavely extending tooth flanks (11, 12), whose axial ends (15, 16) are less curved than their area of the axial centre.

10 Claims, 2 Drawing Sheets

ROTATION CONNECTION FOR CONNECTING UNALIGNED MACHINE ELEMENTS

BACKGROUND OF THE INVENTION

The invention concerns a machine arrangement with a first machine having a first rotation connection, a second machine having a second rotation connection, and a shaft for transmission of a torque, the shaft being unrotatably connected with both rotation connections.

The term "machine" covers any device, which produces a torque, for example motors, absorbs a torque, for example pumps, generators or driven machines, convert a torque, for example gears and driving elements, or simply pass on a torque, for example shafts.

For reasons of clarity, the following description of the invention is based on a machine arrangement comprising a hydraulic motor and a gear, the shaft transmitting the torque from the hydraulic motor to the gear.

In a machine arrangement of this kind, the gear housing is fixedly connected with the motor housing. Usually, the fixing is made by means of flanges. In this connection it must be ensured that the outlet shaft of the motor and the inlet shaft of the gear are in alignment, that is have a common rotation axis. When this alignment is not provided, the life of one of the two machines will be substantially reduced, for example due to a wrong bearing load. Deviations in the positioning may for example appear in that the machines are mounted laterally offset in relation to each other, so that the rotation axes of the outlet shaft of the motor and the inlet shaft of the gear are laterally offset, but parallel to each other. Another positioning error could be that the two rotation axes form an angle with each other. Of course, both error possibilities can also be combined.

Problems caused by wrong alignments can also be avoided in that the shaft is made as a cardan shaft. However, this process is both complicated and expensive.

SUMMARY OF THE INVENTION

The invention is based on the task of providing a simple way of keeping the effects of alignment errors small.

In a machine arrangement as mentioned in the introduction, this task is solved in that the shaft has, at least in one end an external toothing engaging with an internal toothing of the machine at this end, said external toothing permitting a swivel movement of the shaft, the teeth of said external toothing having concavely extending tooth flanks, whose axial ends are less curved than their area of the axial centre.

This embodiment provides, at the end of the shaft concerned, a universal joint between the shaft and the machine in question, that is, a joint, which permits a swivel movement of the shaft in relation to the machine during rotation. A universal joint of this kind at one end already balances angle errors. A corresponding toothing structure at both ends of the shaft will also balance alignment errors, which are caused by a lateral offset of the two machines. The use of a toothing structure permits the introduction of the shaft into the corresponding machine. Thus the mounting gets relatively simple. In spite of the opportunity of a swivel movement of the shaft in relation to the machine, the tooth shape shown stands relatively high loads.

The curve of the tooth flanks is made so that the available surface increases towards the axial end of the teeth. Thus, the surface pressure of the teeth, that is, the specific load of the tooth flanks is reduced towards the axial ends. Towards the axial centre the surface and thus also the surface pressure is reduced, that is, the force divided by the surface increases. Here, however, the tooth is thicker, so that it can better stand the load. In toothings known from hydraulic machines, for example U.S. Pat. No. 3,973,880, the conditions would in practice be inverse. Here the surface pressure would increase towards the axial ends of the teeth, which would naturally mean a higher risk of damages. The fact that the tooth flanks are concavely curved also does away with the necessity of making a sharp inner edge. This reduces the risk of a notch effect, which again increases the load ability. An additional advantage gained by this is a low-wear and stable operating behaviour, as, all other conditions being equal, the teeth and the corresponding mating toothing bear on each other with a reduced surface pressure. Thus, with this new embodiment the load can practically be doubled, when assuming that all other dimensions are unchanged. This is firstly caused by the reduction of the notch effect, which contributes substantially to the reduction of the stress level. Another important contribution comes from the improved support and carrying behaviour of the profile compared to a profile with "sharp" teeth on the intermediary shaft.

Preferably, the tooth flanks of neighbouring teeth are connected with each other through a continuously extending profile in the tooth gaps. Thus, also the bottom of the tooth gap can be incorporated in the curve of the tooth flanks. This causes a step- and bend-free connection of the tooth flanks, which improves the operating properties and the wear resistance and increases the load ability.

Advantageously, each axial position of the profile has the same curve as the tooth flanks. Thus, each section vertical to the axial direction shows a continuously differentiatable curve on which the corresponding mating teeth of the internal toothing roll off well.

In a preferred embodiment it is provided that the shape of the tooth gaps is substantially formed by parts of the circumferential surface of cone frustrums facing each other. When a section is made parallel to the axis of the intermediary shaft, the bottom of the tooth gaps consists of two oppositely inclined lines. For production technical reasons, slight deviations from the shape of an exact line are of course permissible. However, in the axial direction the profile has no more distinct curves. The only condition for this is that the inclinations are adapted to the swivel angle of the intermediary shaft in relation to the displacement element or the outlet shaft, respectively. Thus, the load is relatively easily distributed evenly on half the axial extension of each tooth flank, so that again a reduced surface pressure is obtained. The tooth sections have the shape of a conic section.

Advantageously, the bottom in the middle of the tooth gap has an inclination in the range between 1° and 10°, in particular from 1° to 3.5°, in relation to the axis of the intermediary shaft. Such angles have proved to be expedient. In most cases they are completely sufficient to permit the orbiting of the displacement element.

Advantageously, the external toothing has a number of teeth in the range between 3 and 20, in particular between 8 and 12. This gives engagement angles in the range between 30° and 45°. With such engagement angles the teeth have the longest life. Normally, the result is a relatively stable operating behaviour.

Advantageously, the internal toothing has a constant shape in the axial direction. Due to the embodiment of the external toothing of the intermediary shaft, the internal toothing of the displacement element or the outlet shaft, respectively, can now be shaped so that it does not change in the axial direction. Thus, an even better adaptation of the internal toothing to the external toothing is possible.

In this connection, it is preferred that the shape of the teeth of the internal toothing is substantially formed by a part of the circumferential surface of a conical body, for example a cylinder. A conical body occurs through the projection of a conical section into the third dimension. In this situation, a bend may occur on the transition from the tooth flank to the tooth gap, which could lead to a notch effect. However, this is not as critical as it is with the intermediary shaft, as here the components can be dimensioned accordingly large and be accordingly strong.

Preferably, the shaft projects, at least with an end provided with the external toothing, with part of its length extending beyond the external toothing, into the corresponding machine. Thus, the permissible offset can be additionally increased, as a larger length is available for the swivel movement, meaning that the swivel angle can remain small.

Preferably, the first machine is made as a hydraulic motor. In a hydraulic motor the offset problems have negative consequences, particularly with regard to the tightness of the machine. However, the insertion of the shaft with the toothing to a high degree reduces this problem.

BRIEF DESCRIPTION OF THE DRAWINGS

In the following the invention is described on the basis of a preferred embodiment in connection with the drawings, showing.

DESCRIPTION OF THE PREFERRED EMBODIMENT

Figure 1:
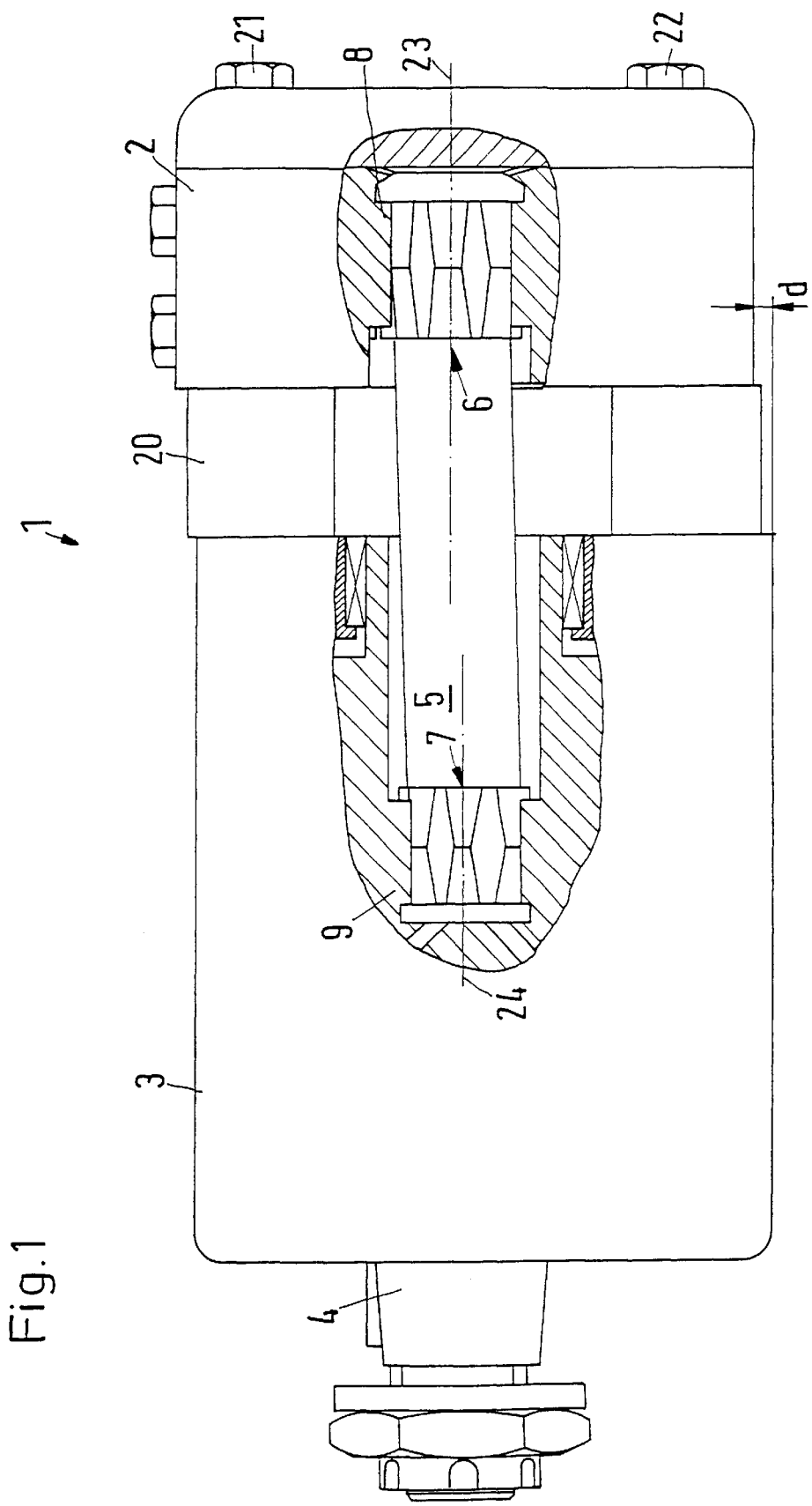
FIG. 1 a schematic view of a machine arrangement

In the present case, a machine arrangement 1 has a first machine in the form of a hydraulic motor 2, which is connected with a second machine in the form of a gear 3. The gear 3 has an outlet shaft 4. The design of the gear 3 is not shown in detail. The gear can, for example, be made as a planetary gearing.

The motor 2 and the gear 3 are connected with each other via a shaft 5. On both axial ends the shaft 5 has an external toothing 6, 7, the external toothing 6 engaging with a schematically shown first notation connection in the form of internal toothing 8 on the motor 2, and the external toothing 7 engaging with a schematically shown second notation connection in the form of internal toothing 9 in the gear 3.

The gear 3 can be mounted direct on the motor 2. In this case, however, an intermediary plate 20 is arranged between the motor 2 and the gear 3. The motor 2, the intermediary plate 20 and the gear 3 are held together in the axial direction by axially extending screw bolts 21, 22, of which only two are shown.

For reasons of clarity shown excessingly large is a lateral offset of the gear 3 in relation to the motor 2, that is, the gear is laterally offset by a small distance d in relation to the motor 2. Accordingly, the rotation axes 23 of the motor 2 and 24 of the gear 3 do no longer meet. They are also laterally offset in relation to each other. For this reason the shaft 5 must be able to perform swivel movements in connection with each rotation. Thus it has an articulated connection with both motor 2 and gear 3.

For this purpose a special shape of the external toothings 6, 7 is provided. This form permits that on the one hand relatively large torques can be transmitted via the shaft 5, on the other hand, however, the wear remains small.

The shape of the external toothing will now be explained on the basis of FIG. 2. However, it must be noted that the conditions for the explanation of, particularly, the inclination angles are shown excessively large.

Figure 2:
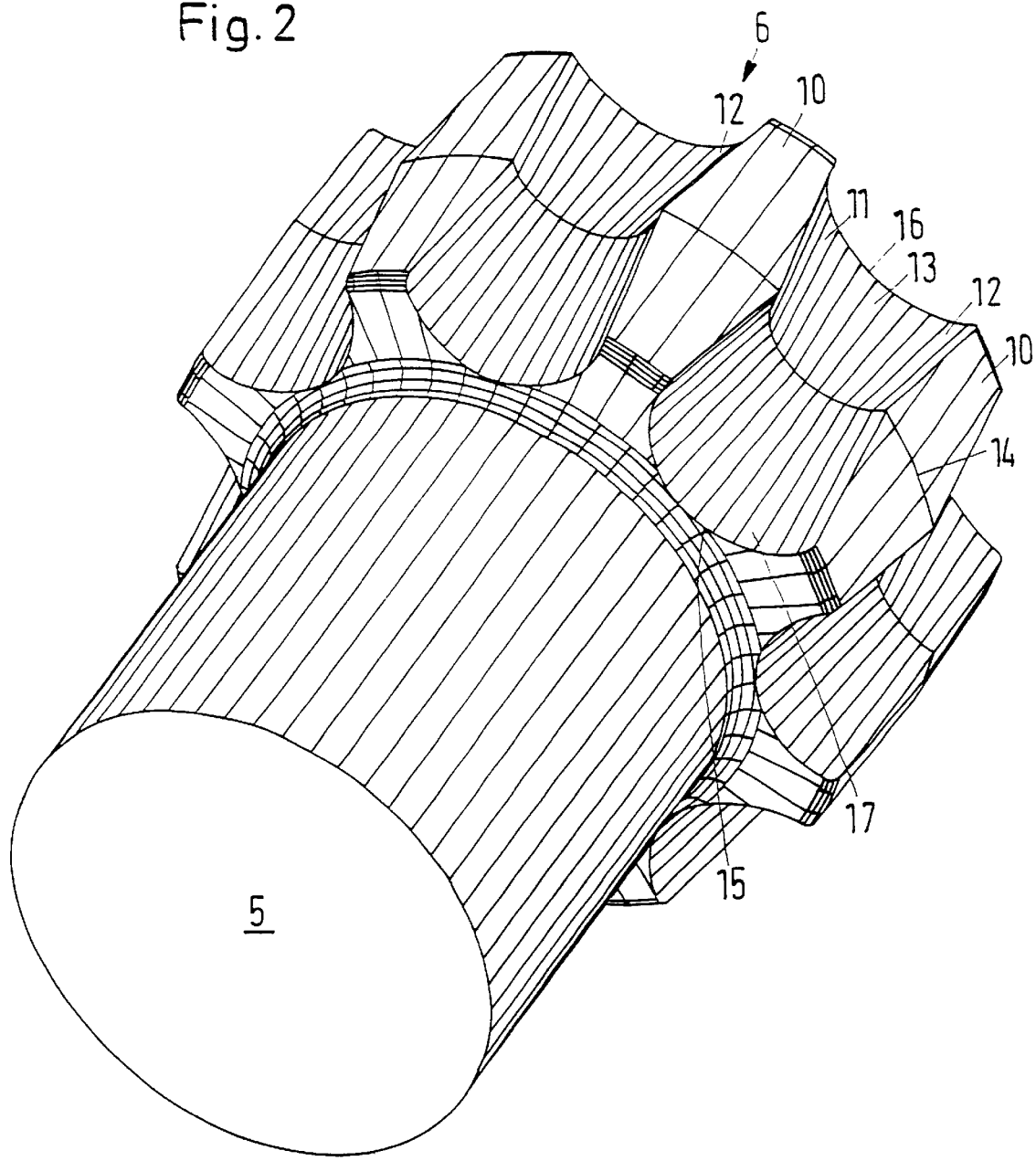
FIG. 2 a perspective view of an end of an intermediary shaft with external toothing

The external toothing 6 of the intermediary shaft 5 shown in FIG. 2 has several teeth 10 with tooth flanks 11, 12. The tooth flanks 11, 12 are concavely curved. The tooth flanks 11, 12 of neighbouring teeth are connected, that is, the concave curve also continues in the bottom 13 of the tooth gaps.

The curve of the tooth flanks 11, 12 and the bottom 13 of the tooth gap is shaped so that it expands from the axial centre 14 of the tooth structure towards the axial ends 15, 16. This is shown in detail in that the distances between the substantially axially extending lines 17, showing the curve, are larger at the axial ends 15, 16 than in the axial centre 14 of the external toothing 6. Thus, also the available surface on the tooth flanks 11, 12 expand towards the axial ends 15, 16 of the toothing, so that with constant forces the surface pressure is reduced. The cross sectional shapes of the teeth can normally be described by means of conical sections, for example, hyperbolas, ellipses or parabolas.

In each axial point of the profile of the tooth gap surrounding the tooth flanks 11, 12 and the bottom 13 is a substantially constant curve or shape. If, in this point, a section were made vertically to the axial direction, this profile in section would practically have the shape of a circle. The surface covering the tooth flanks 11, 12 and the bottom 13 is formed by a part of the circumferential surfaces of two oppositely arranged conical bodies in the form of cone frustrums.

This causes that the bottom 13 in the middle between two teeth 10 has a certain inclination in relation to the axis of the intermediary shaft 5. In the present case the inclination angle is in the range between 1° and 10°, and preferably between 1° and 3.5°. It depends on the inclination, which the intermediary shaft 5 assumes in relation to the axis of the shaft 4 during operation. In FIG. 2, however, as stated, the conditions are shown extremely excessively.

The mating toothing cooperating with the external toothing, that is, for example, the internal toothing 8 of the displacement element 2, can simply be formed by teeth, which have the shape of cylinders, which are partly embedded in the displacement element 2. Thus their shape does not change in the axial direction. Due to their shape they cooperate well, low-wear and loadable with the external toothing shown in FIG. 2.

Expediently, the external toothing 6, 7 has three to twenty teeth, and preferably eight to twelve teeth.

The shaft 5 projects approximately to the axial centre of the gear. The distance to the motor 2 is somewhat increased by the intermediary plate 20. Thus, the swivel angle, which the shaft 5 must pass during operation, is smaller than with an axially shorter distance between the contact point of the shaft 5 with the gear and the corresponding contact point with the motor 2.

What is claimed is:

1. Machine arrangement with a first machine having a first rotation connection, a second machine having a second rotation connection, and a shaft for transmission of a torque, the shaft being unrotatably connected with both rotation connections and having, at least in one end, an external toothing engaging an internal toothing of the machine arrangement at said one end, said external toothing permitting a swivel movement of the shaft, the teeth of said external toothing having concavely extending tooth flanks, the tooth flanks having axial ends which are less curved than an area of axial center of the tooth flanks.

2. Machine arrangement according to claim 1, in which the tooth flanks of neighboring teeth are connected with each other through a continuously extending profile in tooth gaps between the teeth.

3. Machine arrangement according to claim 2, in which each axial position of the profile has the same curve as the tooth flanks.

4. Machine arrangement according to claim 2, in which the shape of the tooth gaps is substantially formed by parts of a circumferential surface of cone frustrums facing each other.

5. Machine arrangement according to claim 2, in which the bottom in the middle of the tooth gap has an inclination in the range between 1° and 10° in relation to the axis of the intermediary shaft.

6. Machine arrangement according to claim 5, in which the inclination is in the range of from 1° to 3.5°.

7. Machine arrangement according to claim 1, in which that the external toothing has a number of teeth in the range between 3 and 20 .

8. Machine arrangement according to claim 7, in which the number of teeth is between 8 and 12.

9. Machine arrangement according to claim 7, in which the internal toothing has a constant shape in the axial direction.

10. Machine arrangement according to claim 1, in which the first machine is a hydraulic motor.

* * * * *